E. BRETCH.
ELECTRIC MOTOR.
APPLICATION FILED JULY 31, 1908.
1,041,009.
Patented Oct. 15, 1912.
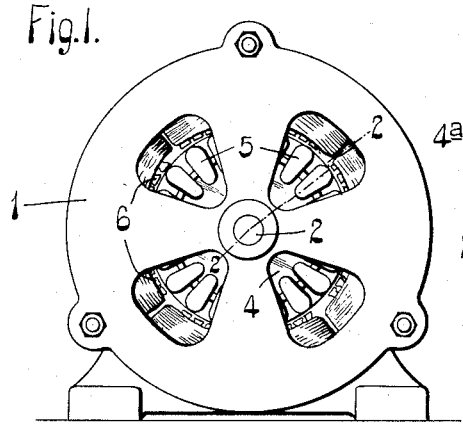
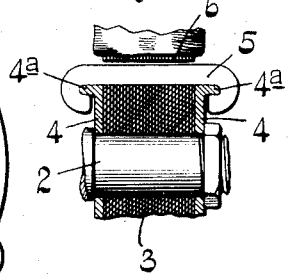
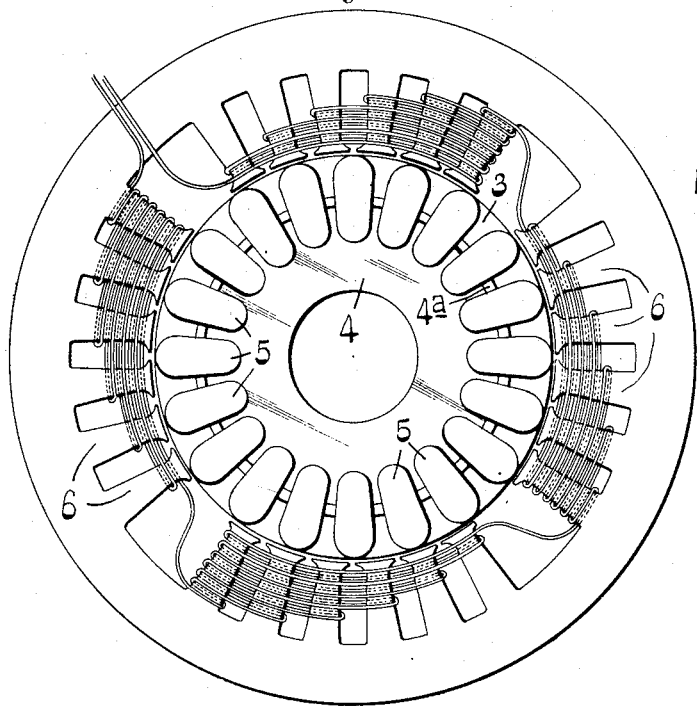
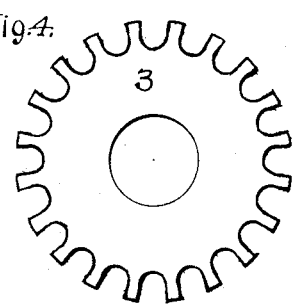
Witnesses
Inventor:
Edward Bretch
by Bakewell Cornwell
Att'ys.

UNITED STATES PATENT OFFICE.

EDWARD BRETCH, OF ST. LOUIS, MISSOURI.

ELECTRIC MOTOR.

1,041,009.   Specification of Letters Patent.   Patented Oct. 15, 1912.

Application filed July 31, 1908. Serial No. 446,260.

*To all whom it may concern:*

Be it known that I, EDWARD BRETCH, a citizen of the United States, residing at St. Louis, Missouri, have invented a certain new and useful Improvement in Electric Motors, of which the following is a full, clear, and exact description, such as will enable others skilled in the art to which it appertains to make and use the same, reference being had to the accompanying drawings, forming part of this specification, in which—

Figure 1 is a front elevational view of a motor constructed in accordance with my invention; Fig. 2 is a sectional view taken approximately on the line 2—2 of Fig. 1; Fig. 3 is a diagrammatical view of the armature and field. Fig. 4 is an elevation of one of the armature disks and showing the slots therein.

This invention relates to electric motors, and more particularly to alternating current induction motors in which there is no commutator, the armature circuits being permanently closed.

One of the objects of my invention is to provide a single phase induction motor which will be inherently self starting, the same as polyphase motors.

Another object is to provide an induction motor which is so constructed that the noise peculiar to this class of motors is eliminated.

Other objects and advantages as well as the novel details of construction will be hereinafter more fully described and pointed out in the claims.

In the drawings, 1 indicates a motor housing provided with bearings within which an armature shaft 2 is mounted. The same general style of armature that is used with polyphase motors can be used in connection with my invention, the squirrel cage type being preferred especially in small size motors. The armature shown in Figs. 1, 2 and 3 consists of the usual laminated structure 3 secured to the shaft 2 and conducting end rings 4. Conductors 5 are arranged in slots in the laminated structure and have their ends bent around flanges 4ª on the end rings and soldered thereto. This armature construction possesses both simplicity and mechanical strength as no holes are required in the end rings for screwing or riveting the conductors thereto and said conductors firmly clamp the laminated structure together.

Fig. 4 illustrates a modified form of armature in which the flanges on the end rings are dispensed with, the ends of conductors 5ª being bent inwardly against the outer face of the rings 4ᶜ.

The field shown in Fig. 1 and Fig. 3 is of the four pole type and comprises a laminated structure built up of punchings, having teeth 6 which receive the winding. In winding each pole of this field a conductor is first wound around one tooth the required number of turns and then wound to include both the first tooth and the next adjacent tooth and thereafter wound to include the first three teeth, and so on until the required number of teeth for the pole are included, as shown diagrammatically in Fig. 3. Under certain conditions it is desirable to include more than one tooth in the first coil, the object being to produce a field pole in which the flux diminishes to zero more abruptly on one side of the point of maximum density than on the other. A short circuited conductor in an alternating field tends to move entirely out of it or into a weaker field, and as in the usual alternating current field winding there are an equal number of armature conductors under a pole on each side of the point of maximum flux density the forces just balance at standstill. If the field is wound as shown diagrammatically in Fig. 3, making one side of the pole the strongest instead of the middle as is usually done, and gradually tapering the strength from one side of the pole to the other, the forces acting on the short circuited conductors of the armature are no longer balanced but have a tendency to move the conductors from the strong side of the pole to the weaker, and by arranging the pole strength to taper the same way in all the poles around the field the motor becomes self starting with the same general characteristics as the ordinary two and three phase motors. While arranging the windings to make one side of the pole the position of maximum strength may give the greatest starting torque, it is nevertheless evident that if the maximum strength is displaced to one side of the middle of the pole, even though it is not at the extreme edge, or if only a part of the poles are wound to produce a displacement, the motor will be self starting, the degree of starting torque varying with the construction and effectiveness of the flux displacement.

In order to eliminate the noise peculiar to induction motors I construct my improved motor so that the number of conductor receiving slots in the field and armature have for a common divisor a number the same as the number of poles; for example, as shown in Fig. 3 in which a four pole motor is provided with a field having twenty-four wire receiving slots and an armature having twenty slots. In the usual construction wherein the number of slots or teeth in the field and armature have no common divisor the forces acting between the field and armature are never the same in all the poles at any instant since the relation between the conductors of the field and armature cannot be the same in all the poles at any instant. The consequence is that these unbalanced forces varying from instant to instant set up vibration in the motor which produces a noise. When constructed so that the teeth of each member have a common divisor equal to the number of poles, any pole of the armature bears the same relation to the corresponding pole of the field as any other and the result is a perfect balance of all forces in any position, thus eliminating the vibration.

While a form of squirrel cage armature is described in connection with my improved motor, any of the usual forms of armature used in polyphase motors may be used in lieu thereof. In case it is necessary to hold down the starting current under severe starting conditions, or on some classes of variable speed work, a form of armature in which resistance can be inserted may be used. The speed may be varied by supplying the field with reduced voltage by a rheostat or transformer. The number of poles and the number of teeth per pole may also be varied to suit various conditions.

In Fig. 3 I have shown a regularly spaced field punching such as is used in the ordinary polyphase motors having some of the teeth cut away to accommodate the comparatively large number of conductors along one side of the poles.

Where I use the term "field" in the claims it is to be understood as the primary member, and "armature" the secondary member, regardless of which may be the movable member, and by the term "alternating current" I mean to include any current which varies in intensity and is capable of producing an inductive effect on a secondary winding irrespective of wave form.

Having thus described my invention, what I claim as new and desire to secure by Letters Patent is:

1. An electric motor having a field, an armature, conductors in the form of bars extending across said armature, a flanged conductor for electrically connecting said bars, the ends of said bars being bent into interlocking engagement with the flange of said conductor; substantially as described.

2. An electric motor having a field, an armature, conductors in the form of bars extending across said armature, a flanged conductor for electrically connecting said bars, said bars being mechanically connected to said conductor by having their end portions interlocked with the flange on the conductor; substantially as described.

3. An electric motor having a field, an armature provided with a laminated core, conductors in the form of bars embedded in the surface of the armature and extending across the same, conducting rings on the ends of the armature, flanges on said conducting rings, and the end portions of said bars being bent around said flanges; substantially as described.

4. An electric motor having a field, an armature provided with a laminated core, conductors in the form of bars embedded in and extending across the armature core, a flanged conducting ring arranged on each side of the armature core, the end portions of said bars being bent around the edges of said rings; substantially as described.

In testimony whereof I hereunto affix my signature in the presence of two witnesses, this twenty seventh day of July 1908.

EDWARD BRETCH.

Witnesses:
A. J. McCauley,
George Bakewell.